(12) United States Patent
Aguilera

(10) Patent No.: US 7,882,508 B1
(45) Date of Patent: Feb. 1, 2011

(54) TRACING INFORMATION FLOW USING A SIGNATURE

(75) Inventor: Marcos K. Aguilera, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 947 days.

(21) Appl. No.: 11/796,234

(22) Filed: Apr. 27, 2007

(51) Int. Cl.
G06F 3/00 (2006.01)
G06F 9/44 (2006.01)
G06F 9/46 (2006.01)
G06F 13/00 (2006.01)

(52) U.S. Cl. ........................................ 719/320; 714/45
(58) Field of Classification Search .................. 719/318, 719/320; 718/100
See application file for complete search history.

(56) References Cited

U.S. PATENT DOCUMENTS

| | | | | |
|---|---|---|---|---|
| 6,742,143 | B2 * | 5/2004 | Kaler et al. ..................... | 714/39 |
| 7,027,951 | B1 | 4/2006 | MacCormick et al. | |
| 7,039,921 | B2 * | 5/2006 | Shah et al. .................. | 719/318 |
| 7,194,664 | B1 * | 3/2007 | Fung et al. .................... | 714/45 |
| 2002/0083217 | A1 * | 6/2002 | Ward et al. .................. | 709/328 |
| 2004/0111706 | A1 | 6/2004 | Mogul et al. | |
| 2005/0015424 | A1 | 1/2005 | Aguilera et al. | |
| 2005/0049924 | A1 * | 3/2005 | DeBettencourt et al. ...... | 705/21 |
| 2005/0273600 | A1 * | 12/2005 | Seeman ....................... | 713/160 |
| 2006/0282546 | A1 | 12/2006 | Reynolds et al. | |

OTHER PUBLICATIONS

M. K. Aguilera et al., "Performance Debugging for Distributed Systems of Black Boxes," SOSP '03, 16 pages, Oct. 2003.
P. Barham et al., "Using Magpie for Request Extraction and Workload Modelilng," OSDI '04, 6th Symposium on Operating Systems Design and Implementations, pp. 259-272, 2004.
D. Metzler et al., "Similarity Measures for Tracking Information Flow," CISM '05, 8 pages, 2005.
E. Suh et al., "Secure Program Execution Via Dynamic Information Flow Tracking," Computation Structures Group Memo 467, MIT Computer Science & Artificial Intelligence Laboratory, 12 pages, Nov. 2003.
D. Metzler et al., "The Recap System for Identifying Information Flow," SIGIR '05, 1 page, Aug. 2005.
P. Reynolds et al., "Pip: Detecting the Unexpected in Distributed Systems," Proceedings 3rd Symposium on Networked Systems Design and Implementation (NSDI), pp. 1-14, May 2006.
P. Reynolds et al., "WAP5: Black-box Performance Debugging for Wide-Area Systems," Proceedings of 15th International World Wide Web Conference, pp. 1-10, May 2006.

* cited by examiner

Primary Examiner—Diem K Cao

(57) ABSTRACT

To perform information tracing, at least one signature to be traced is received. It is detected that a first process causes data to be provided to at least one of a second process and a file. It is determined whether the data contains the at least one signature. In response to determining that the data contains the at least one signature, a log is updated. The log contains information identifying at least one of processes and files that are part of a flow of the at least one signature.

17 Claims, 3 Drawing Sheets

TRACING INFORMATION FLOW USING A SIGNATURE

BACKGROUND

In a distributed system having multiple nodes, information processed at one node can flow to another node. For example, one node can be a web server that accepts customer orders. The orders can then flow to other nodes, such as nodes to validate the orders, nodes to perform billing, and nodes for managing handling and shipping. Often, information flow between or among nodes of the distributed system can be associated with issues, such as the information flow following unexpected paths, bottlenecks occurring in portions of the distributed system, or other issues. The presence of such issues can be disruptive to efficient operation of the distributed system.

BRIEF DESCRIPTION OF THE DRAWINGS

Some embodiments of the invention are described with respect to the following figures.

DETAILED DESCRIPTION

Figure 1:
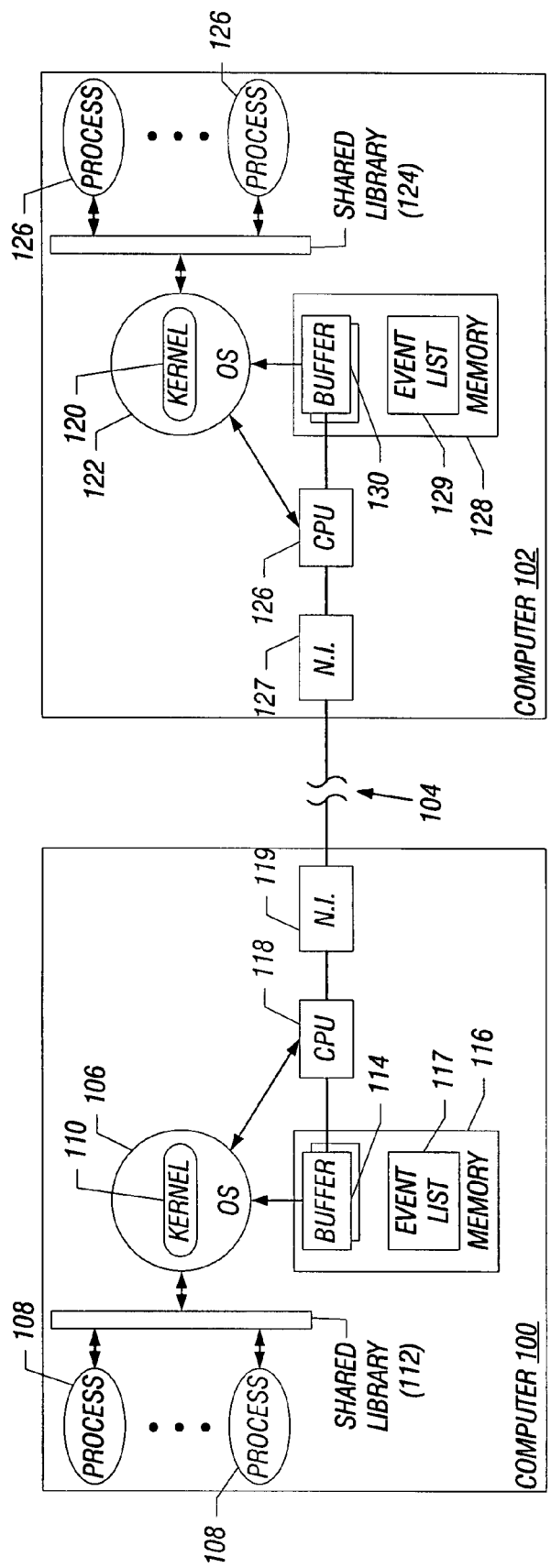
FIG. 1 is a block diagram of a distributed system including multiple computers in which a signature-based information flow tracing technique according to some embodiments can be provided.

In accordance with some embodiments, an information flow tracing technique that can be applied in a distributed system is based on the use of a signature. A "signature" is a piece of information, such as a byte sequence, a character string, a number, and so forth. The information flow tracing technique monitors requests made by various processes in the distributed system to determine whether data associated with such requests contain the signature. The requests can be write requests, read requests, or requests that involve the communication of data from one process to another process. As used here, a "process" refers to an instance of a software program that runs in a computer within the distributed system. In some operating contexts, such as in a WINDOWS® operating system context, a process can be referred to as a "thread." Thus, the term "process" is intended to cover a process, thread, or any other instance of a software program that can run in a computer.

A "distributed system" can refer to a system that has multiple computers or to a single computer that has multiple processes. In a multi-computer distributed system, each computer can execute one or more processes.

Information can flow from one process to another process in the distributed system (either between processes in the same computer or processes on different computers). The flow of information can be direct flow (such as when a first process sends a message containing the information to a second process), or indirect communication (such as when a first process writes data into a file, which is later retrieved by a second process). Tracing of an information flow using a signature is accomplished by detecting whether data associated with the information flow among processes or between processes and files contains the signature. An information flow follows a path that includes processes and files.

Note that information can be modified in the course of flowing among processes in the distributed system. However, even though information is modified, the information flow tracing is still possible by tracing a specific signature in the information.

An example information flow is in a customer order context, where a customer can submit an order at a virtual web store (such as at a web server). The newly-received order is provided by the virtual web store to an order-processing server for validation and inventory checks. After processing, the order can then go to a billing server and to other servers associated with handling and shipping of the order. In this context, the signature that can be used for tracing the flow of information (in this example, a customer order) is a customer order number. In other example contexts, the signature can be message identifiers, product identifiers, employee identifiers, and so forth.

As processing of the customer order proceeds from server to server, different files can be created into which the signature being traced (e.g., customer order number) is inserted. For example, the customer order number can appear in a purchase order file, an invoice file, a shipping list file, and so forth. Tracing of the signature allows the system to identify processes and files that are part of the information flow.

Other examples of information flow include data flowing in a distributed storage system or database system, messages in a network, and others.

Tracing an information flow can be used for various purposes. In one example, the information flow can be monitored to identify unexpected paths taken by the information flow. In another example, the information flow can be used to find unexpected processing delays (or bottlenecks) in the processing of the information flow at various points of the distributed system. Also, the information flow can be used to discover the structure of large and complex distributed systems.

FIG. 1 illustrates an example distributed system that has computers 100 and 102 interconnected by a network 104. The computer 100 includes an operating system 106 (e.g., UNIX operating system, Linux operating system, WINDOWS® operating system) and one or more processes 108 executable on one or more central processing units (CPUs) 118 in the computer 100. In one embodiment, a signature-based information flow tracing mechanism can be implemented in a kernel 110 of the operating system. A "kernel" refers to the center or core of the operating system that provides basic services for other parts of the operating system. A kernel can include a scheduler for performing scheduling tasks with respect to processes, a supervisor that provides use of computer resources to a process when the process is scheduled, and other components, such as interrupt handling components and so forth. Another component according to some embodiments included in the kernel 110 is the information flow tracing mechanism to perform information flow tracing using a signature.

Alternatively, instead of implementing the information flow tracing mechanism in the kernel 110, the information flow tracing mechanism can be provided in a shared library 112 that is provided between processes 108 and the operating system 106. The shared library 112 intercepts calls made by the processes 108, and in turn, submits system calls to the operating system 106 in response to such calls from the processes 108. An example of the shared library 112 is a dynamic link library (DLL).

To perform information flow processing, a user (or software application) can specify a signature (or multiple signatures) that is (are) to be traced. Also, the user or application can specify where the tracing should start, by providing an identifier of a process (pid) and the host name where the process is. The information flow tracing mechanism monitors system calls made by this first process, where the system calls can be inter-process communication system calls (to request communication of messages between processes) or file input/ output (I/O) system calls (to read from or write to a file).

The information flow tracing mechanism determines whether the request specified by a system call is associated with data that contains the signature. Note that the data associated with the request can be communicated between processes (inter-process communication) or can be read from or written to a file (file I/O system call). If the information flow tracing mechanism determines that the data associated with a request contains a signature, then an event associated with the request is recorded in a log, where the event can include a time stamp, an identifier of the source (the process that invoked the request), an identifier of the destination (which can be another process or a file), and/or other items. Generally, the event log contains information that identifies processes and/or files that are part of a flow of the signature (or multiple signatures).

When data containing the signature flows to another process having a second pid, then the information flow tracing mechanism starts to monitor the other process as well (in addition to any process[es] the information flow tracing mechanism is already monitoring) to determine if the signature is further propagated. If data containing the signature is written to a file, then the information flow tracing mechanism also starts monitoring the file to determine whether data containing the signature is later read. The monitoring and recording of events continues until the user (or application) chooses to finish the monitoring. At any point, the user (or application) can examine the event log to retrieve the information traced thus far. This information can be displayed as a report, which can be in the form of a table, a list, or a graph of nodes (where the nodes represent processes). The graph can also include edges between nodes to indicate information flow between the nodes. The edges can be time-labeled with time stamps extracted from the events recorded in the event log.

The information flow tracing mechanism discussed above refers to information flow tracing that monitors both inter-process communications as well as file I/O system calls. However, in a different embodiment, the information flow tracing mechanism can monitor just inter-process communications, without monitoring file I/O system calls. This latter information flow tracing mechanism is referred to as a reduced information flow tracing mechanism.

In accordance with some embodiments, by implementing the information flow tracing mechanism in the operating system kernel or a shared library, software applications do not have to be modified such that a recompilation or instrumentation of applications does not have to be performed. Moreover, the information flow tracing mechanism is associated with a relatively low level of overhead by employing the following techniques: (1) not every system call is monitored, just those that involve inter-process communication or file I/O, and just those involving processes or files that are currently tagged to be monitored, and (2) the monitoring is performed by scanning buffers at the same time that the kernel 110 copies buffers for internal processing by the kernel (a buffer is associated with each system call to store data associated with the system call). A buffer (such as buffer 114 in FIG. 1) is typically stored in memory 116, where the memory 116 is system memory that can be implemented with various types of storage devices. When the kernel makes a copy of the buffer 114 for internal processing, there are usually free CPU cycles available due to the difference in operating speeds of the CPU 118 and the memory 116. These free CPU cycles can be used to perform scanning of the content of the buffer 114 to determine whether the signature is contained in the buffer 114.

Alternatively, instead of storing the buffer 114 in memory 116, the buffer 114 can be contained in cache memory inside the CPU 118, such as level 1 (L1) cache memory or level 2 (L2) cache memory.

The information flow tracing mechanism can be a distributed mechanism implemented on multiple computers. Thus, in the example in FIG. 1, the information flow tracing mechanism can be implemented in the kernel 110 of the operating system 106 in computer 100, as well as in kernel 120 in operating system 122 of the second computer 102. Thus, the information flow tracing mechanism is able to monitor a flow of information between processes (or between a process and file) within one computer, or between processes (or between a process and file) located at different computers. Like the computer 100, the computer 102 also includes a shared library 124 between the operating system 122 and one or more processes 126 executable on one or more CPUs 126 in the computer 102.

The computer 102 further includes memory 128, which can store buffers 130 used in system calls made in response to requests of the processes 126.

As further depicted in FIG. 1, each of the memories 116 and 128 further stores a respective event list 117 and 129, where the event list 117, 129 is the event log for logging events associated with system calls that are associated with data containing the signature being monitored. The computers 100, 102 further include network interfaces 119 and 127 to allow the computers 100, 102 to communicate with each other over the network 104.

Figure 2:
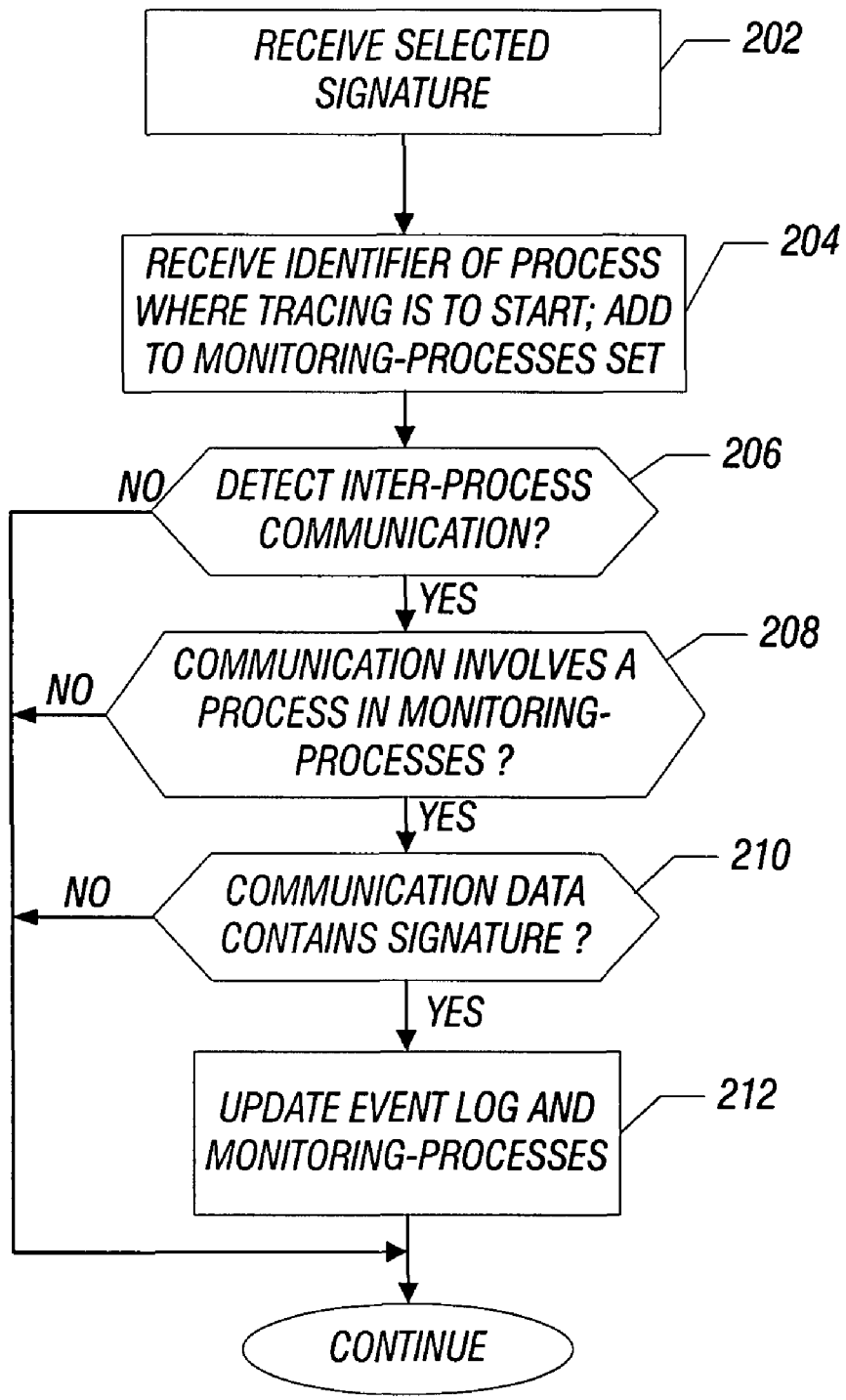
FIG. 2 is a flow diagram of a technique of tracing information flow according to a first embodiment.

FIG. 2 shows a process performed by the reduced information flow tracing mechanism according to an embodiment. FIG. 2 is described in connection with the pseudocode below:

```
VARIABLES:
    1     monitoring-processes: set of processes being monitored
    2     event-list: list of events
CODE:
    3          procedure start_tracing
    4             signature ← choose a signature
    5             pid ← choose some process id to trace initially
    6             monitoring-processes ← {pid}
    7             when process p sends data d to process q
    8                if p ∈ monitoring-processes and d contains signature
    9                   add (current-time, p, q) to event-list
    10                  add q to monitoring-processes
```

Several data structures are defined, including a monitoring-processes data structure that includes a set of processes that are being monitored (hereinafter the "monitoring-processes set"), and an event-list data structure that is a list of events (hereinafter the "event log"). As shown in FIG. 2, a selected signature to be traced is received (at 202) by the reduced information flow tracing mechanism, where the signature can be selected by a user or by an application. Alternatively, multiple signatures can be specified by a user or application. One reason to trace multiple signatures is that a process may perform format conversions that alter the signature. For example, an ASCII string may be converted into a unicode string at some stage of processing. In this example, both the ASCII and unicode versions of the string are selected as signatures to be traced.

Also, an identifier of a process where tracing is to be started is received (at 204). The identifier of a process is referred to as pid. The process identifier for this initial process is added to the monitoring-processes set (see line 6 of the pseudocode above). Alternatively, instead of beginning the tracing at a particular process, tracing can start at a set of processes, which can include up to all processes in a system.

After the initialization tasks discussed above, the reduced information flow tracing mechanism next waits for detection (at 206) of an inter-process communication in which data is sent from a first process to a second process. The inter-process communication is of data d from process p to process q (see "when" clause at line 7 of the pseudocode above). The mechanism determines (at 208) if the communication involves a process p that is identified by the monitoring-processes set (see "if-then" clause at line 8 of the pseudocode above). Note that if the process is not identified by the monitoring-processes set, then any further tasks do not have to be performed to reduce the amount of overhead associated with the information flow tracing technique. If the communication involves a process p identified by the monitoring-processes set, then the mechanism determines (at 210) if the communication data (d) contains the signature (see line 8 of the pseudocode above). If the data d contains the signature, then the event log and monitoring-processes set are updated (at 212) by adding (current-time, p, q) to event-list and q to monitoring-processes, where the parameter current-time is the time stamp of the event that corresponds to the inter-process communication. These updates are reflected in lines 9 and 10 of the pseudocode above.

Figure 3:
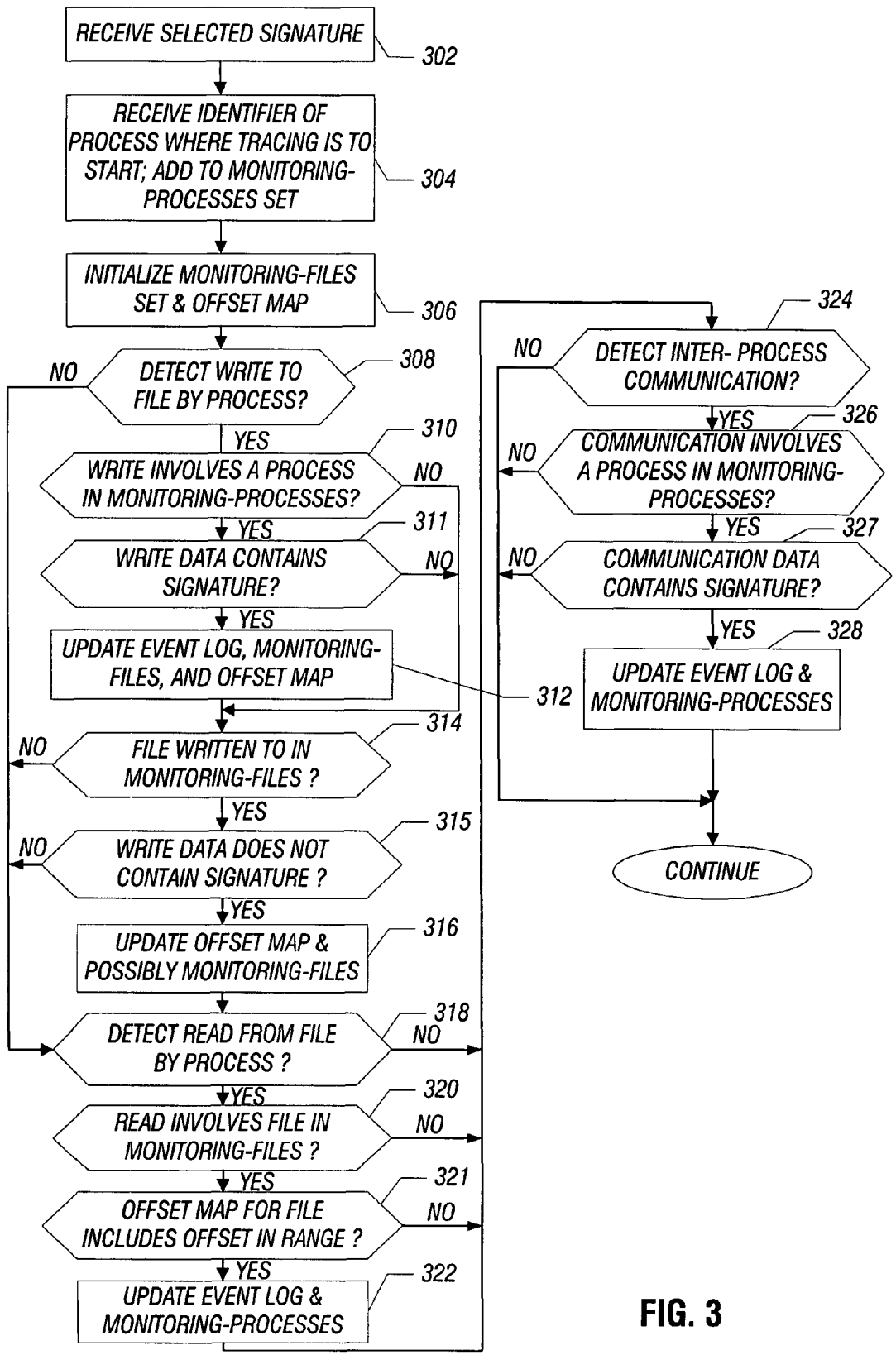
FIG. 3 is a flow diagram of a technique of tracing information flow according to a second embodiment.

FIG. 3 shows a process performed by the full information flow tracing mechanism that traces information flow for both inter-process communications and file accesses. FIG. 3 is described in connection with the pseudocode below.

```
VARIABLES:
    1   monitoring-processes: set of processes being monitored
    2   monitoring-files: set of files being monitored
    3   file-offset-map: a map from files in monitoring-files to a set of
        offsets
    4   event-list: list of events
CODE:
    5   procedure start_tracing
    6       signature ← choose a signature
    7       pid ← choose some process id to trace initially
    8       monitoring-processes ← {pid}
    9       monitoring-files ← ø
    10      file-offset-map ← ø
    11      when process p writes data d to file f at offset off length len:
    12          if p ∈ monitoring-processes and d contains signature then
    13              add (current-time, p, f) to event-list
    14              add f to monitoring-files
    15              add offsets [off, off+len] to file-offset-map(f)
    16          if f ∈ monitoring-files and d does not contain signature then
    17              remove all offsets in range [off,off+len] from file-offset-
                    map(f)
    18      when process p reads from file f at offset off length len
    19          if f ∈ monitoring-files and file-offset-map(f) includes an
                offset in range [off, off+len] then
    20              add (current-time, f, p) to event-list
    21              add p to monitoring-processes
    22      when process p sends data d to process q
    23          if p ∈ monitoring-processes and d contains signature
    24              add (current-time, p, q) to event-list
    25              add q to monitoring-processes
```

Several data structures are defined, including the monitoring-processes set that includes a set of processes that are being monitored, a monitoring files data structure that includes a set of files being monitored (hereinafter the "monitoring-files set"), a file-offset-map data structure (hereinafter the "offset map") that is a map from a file in the monitoring files set to a set of offsets representing locations where signatures are located in respective files, and the event log(event-list). Note that there are multiple sets of offsets, one set for each file. In the pseudocode above, the set of offsets for a file f is represented as file-offset-map(f).

As shown in FIG. 3, a selected signature to be traced is received (at 302) by the full information flow tracing mechanism, where the signature can be selected by a user or by an application. Alternatively, multiple signatures can be specified by a user or application.

Also, an identifier (pid) of a process where tracing is to be started is received (at 304). The process identifier for this initial process is added to the monitoring-processes set (see line 8 of the pseudocode above). Alternatively, instead of beginning the tracing at a particular process, tracing can start at a set of processes, which can include up to all processes in a system.

Another possibility is to allow the tracing to start at a file or a set of files containing the signature. This can be accomplished by including such file(s) in the monitoring files set, and initially scanning the file(s) in the monitoring files set to determine at which offsets the signature is located. The offsets are then placed in the respective offset maps. Alternatively, if there are many files or some of the files are so large that scanning them is undesirable, then the information flow tracing mechanism can be modified so that the file-offset-map information is not used or is omitted. In the case where offset maps are not used or are omitted, detecting whether read data contains a signature can be accomplished by scanning the buffer that is returned to the process as a result of a read system call. This scanning can be performed as the kernel is copying its internal buffers into the user buffers, to reduce the overhead associated with checking for the signature.

As depicted in FIG. 3, each of the monitoring-files set and each offset map is initialized (at 306) to a corresponding empty set (in other words, each of these data structures initially contains no data) (see lines 9, 10 of the pseudocode above).

After the initialization tasks discussed above, the information flow tracing mechanism next waits for detection of a request (which can be in the form of a system call caused by a request submitted by a particular process). The types of requests include a write to a file by a process, a read of a file by a process, or an inter-process communication in which data is sent from a first process to a second process.

If the information flow tracing mechanism detects (at 308) a write to a file by a process, then the mechanism determines (at 310) if the write involves a process identified by the monitoring processes set. If the write involves a process in the monitoring-processes set, the mechanism determines (at 311) whether data associated with the write request contains the signature (the selected signature received at 302). Task 308 is reflected in line 11 of the pseudocode, which is a "when" clause in which the process is identified as "process p" (p is an identifier of the process) and the data associated with the request submitted by the process is referred to as "data d." The file to which the data is being written is identified as "file f" (f is an identifier of the file) and the offset in the file to which the write is to occur is referred to as "offset off." The length of the data d is identified as "len."

Tasks 310 and 311 correspond to the "if-then" clause at line 12 of the pseudocode above.

In response to determining that the process p is in the monitoring-processes set and the data d contains the signature, the event log is updated (at 312) by adding an event represented as (current-time, p, f) to the event log (line 13 of the pseudocode). The parameter current-time is the time stamp of the event that corresponds to writing the data d to the file f by process p. The monitoring files set is updated (at 312) by adding f to the monitoring-files set, where f identifies the file that has been written to. The offset map is updated (at 312) by adding offsets [off, off+len] to the offset map corresponding to file f, file-offset-map(f), where off identifies the offset in the file f to which the data containing the signature has been written. The offset map for file f thus identifies all offsets within the file f that potentially can contain the signature. The updates of the monitoring files set and the offset map at 312 are reflected at lines 14 and 15 of the pseudocode above.

The information flow tracing mechanism also determines (at 314) whether the file f that is being written to is part of the monitoring files set. If so, the mechanism determines (at 315) whether the write data d does not contain the signature. The determinations 314, 315 correspond to the "if-then" clause at line 16 of the pseudocode. The check here is performed to detect for the situation where a portion of a file identified by the monitoring-files set has been written to with data that does not contain the signature. In this situation, the offset map for the file f is updated (at 316) to remove all offsets corresponding to the offset range within file f to which the data d has been written. This action corresponds to line 17 of the pseudocode. Since the data d written to these offsets does not contain the signature, the offset map for file f is updated to remove these offsets. Note that if the offset map for file f becomes an empty set as a result of the removing performed at 316, then the file f is removed from the monitoring files set.

Another request that can be detected (at 318) by the information flow tracing mechanism is when a process p reads from a file f (which corresponds to the "when" clause at line 18 of the pseudocode). The offset in the file where the read is to occur is identified as offset off. The length of the data to be read is identified as length len. In response to the read request, the mechanism determines (at 320) if the file f is identified by the monitoring files set and, if so, the mechanism determines (at 321) if the offset map for the file f includes an offset in the range [off, off+len]. Determinations 320, 321 correspond to the "if-then" clause at line 19 of the pseudocode. If the process p is reading from a portion of the file f that contains the signature (the "if-then" clause of line 19 of the pseudocode evaluating to "true"), then the event log is updated (at 322) by adding (current-time, f, p) to event-list, and the monitoring-processes set is updated (at 322) by adding p.

A third request that can be initiated by a process is an inter-process request. This is detected (at 324), and corresponds to the third "when" clause at line 22 of the pseudocode. The inter-process communication is of data d from process p to process q. The mechanism determines (at 326) if the communication involves a process p that is identified by the monitoring-processes set, and if so, the mechanism further determines (at 327) if the data d contains the signature (the "if" clause at line 23 of the pseudocode). If so, then the inter-process communication is of data that contains the signature, and the event log and monitoring-processes set are updated (at 328) by adding (current-time, p, q) to event-list, and q to monitoring-processes.

The description provided above assumes that when a process communicates data containing the signature, the process does so with a single system call. This may not always be the case, as a process may send a first portion of the signature in one system call and a second portion of the signature in a subsequent system call. To detect this behavior, the information flow tracing mechanism can keep track of what parts of the signature has been communicated so far.

In checking for overwriting of a signature in a file, the description above simply checks if the beginning of the signature is overwritten with something that is not the signature. In an alternative implementation, the information flow tracing mechanism can check whether any part of the signature is overwritten.

In a multi-computer environment, certain computers may not implement the information flow tracing mechanism. If this is the case, then the tracing mechanism according to some embodiments can be operated in a degraded mode to handle the situation where not all computers implement information flow tracing. Thus, if data containing a signature is sent to a computer where information flow tracing is not deployed, then the event log will show that the signature has flowed into such a computer, but no further information flow from that computer will be detected. Such computers are shown as sinks of information. Upon seeing such a sink node, a user may decide to deploy an information flow tracing mechanism according to some embodiments at the node, and restart the tracing. This is enabled if an interactive mode of operation is provided where the set of nodes that employ the information flow tracing mechanism according to some embodiments progressively increases over time as a user finds more and more nodes in which the information flow tracing mechanism should be implemented.

When a process p in one host (e.g., computer 100 in FIG. 1) sends a signature to a process q in a second, different host (e.g., computer 102 in FIG. 1), the information flow tracing mechanism provides the ability to inform the second host to start monitoring process q (by adding process q to the monitoring-processes set of the second host). Such coordination between different hosts (for purposes of information flow tracing) is accomplished by sending a notification over the network from the first host to the second host. The notification should arrive at the second host no later than when the signature arrives to ensure that the second host will not receive and propagate the signature without subjecting the receipt and propagation to the information flow tracing. In one implementation, a transport protocol (such as the Transmission Control Protocol or TCP) can be modified to include a special flag to notify the second host that the signature has been detected. When the receiving kernel sees this flag in a TCP message, the receiving kernel can start monitoring the process at the receiving end. This flag can be used by a kernel, and not by user processes.

In the embodiment where the information flow tracing mechanism is implemented in a shared library, instead of in the kernel, the notification between different hosts can be implemented as follows. If TCP communication is used, then a specially marked (e.g., with a flag) sequence can be sent in a communication stream (a form of in-band signaling) between the first and second hosts to serve as the notification. The receiving host can transparently remove the specially marked sequence so that applications in the receiving host do not see the special marking.

If applications communicate with the User Datagram Protocol (UDP), which is an unreliable datagram service, then notification can be sent as a special datagram. There is some risk that the UDP datagram will be lost or received out of order, in which case the notification can be lost or received late. This can result in some missed events in the trace. To mitigate this issue, retransmissions of the notification datagram can be performed. Another solution is to verify the receipt of datagrams for the presence of signatures, as discussed further below.

The issue of lost datagrams does not exist in the kernel implementation which involves modifying the TCP or UDP protocol to transmit an extra bit indicating the presence of the signature.

If a process writes data containing the signature to a network file server, and subsequently another process reads the data containing the signature, the information flow tracing mechanism described above will not be able to identify this if information flow tracing is not implemented in the network file server. To address this issue, the network file server can be modified so that files containing the signature are tagged and the file server remembers the offset where the signature is stored. In addition, the client-server file protocol can be changed so that clients can tell the file server when a signature is being written, and the file server can inform clients when the signature is being read.

As noted above, there are embodiments where offset maps indicating locations of files containing the signature are not implemented. In such embodiments, files (that are not associated with offset maps) in the monitoring files set can have a special flag to indicate that such files do not employ offset maps. When reading from such files, the information flow tracing mechanism employs the scanning of read data in the buffer to determine if the signature is being read.

Note that scanning of data in a buffer for the signature can also be performed in the context of inter-process communication between processes in different hosts. The receiving host is able to scan the data buffer to determine whether the data of the inter-process communication contains the signature. If this capability implemented, then the use of specially marked sequences or datagrams as discussed above to coordinate tracing between different hosts can be omitted. Thus, in an inter-process communication in which a signature is sent from process p to process q in a different host, rather than send a notification to the second host to start monitoring q, the information flow tracing mechanism can simply monitor the buffers received at the second host for the presence of the signature. If the signature is detected in the second host, the receiving process is added to the monitoring-processes set, and an event is added to the log.

Instructions of software described above (including processes, kernels, and shared libraries of FIG. 1) are loaded for execution on a processor (such as one or more CPUs 118, 126 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of information flow tracing, executed by at least a first computer, comprising:
    receiving at least one signature to trace;
    detecting a first process causing data to be provided to at least one of a second process and a file;
    determining whether the data contains the at least one signature;
    in response to determining that the data contains the at least one signature, updating a log with information associated with providing the data to at least one of the second process and the file, wherein the log contains information identifying at least one of processes and files that are part of an information flow containing the at least one signature, wherein the receiving, detecting, determining, and updating are part of the information flow tracing;
    during the information flow tracing, updating a first data structure to identify processes that have accessed data containing the at least one signature;
    during the information flow tracing, updating a second data structure to identify files that contain the at least one signature; and
    during the information flow tracing, updating offset maps that indicate locations in the identified files that contain the at least one signature.

2. The method of claim 1, wherein receiving the at least one signature to trace comprises receiving plural signatures to trace.

3. The method of claim 1, wherein detecting the first process causing data to be provided comprises detecting a system call to an operating system of the at least first computer.

4. The method of claim 3, wherein detecting the system call comprises a kernel of the operating system detecting the system call, and wherein determining whether the data associated with the system call contains the at least one signature is performed by the kernel.

5. The method of claim 4, wherein determining whether the data contains the at least one signature is performed while the kernel is copying the data.

6. The method of claim 3, wherein detecting the system call comprises a shared library detecting the system call, and wherein determining whether the data associated with the system call contains the at least one signature is performed by the shared library.

7. The method of claim 1, wherein the first process is executed in the first computer, and wherein the determining and updating are performed in a second, different computer.

8. The method of claim 7, further comprising the first computer sending a notification to the second computer to start monitoring the second process that is part of the second computer to further trace the at least one signature.

9. An information flow tracing method, executed by at least a first computer, comprising:
    receiving at least one signature to trace;
    detecting a first process causing data to be provided to at least one of a second process and a file;
    determining whether the data contains the at least one signature;
    in response to determining that the data contains the at least one signature, updating a log with information associated with providing the data to at least one of the second process and the file, wherein the log contains information identifying at least one of processes and files that are part of an information flow containing the at least one signature;

detecting that the data containing the at least one signature is being sent to a different computer in which tracing of the at least one signature is not enabled; and in response to the detecting that the data is sent to the different computer, adding an indication to the log that data containing the at least one signature has been sent to a computer in which the signature tracing is not enabled.

10. The method of claim 9, further comprising determining whether the first process is identified by a first data structure, wherein determining whether the data contains the at least one signature is performed in response to determining that the first process is identified by the first data structure.

11. The method of claim 10, wherein the data containing the at least one signature is communicated to the second process, the method further comprising:

adding an identifier of the second process to the first data structure.

12. The method of claim 10, wherein the data containing the at least one signature is written to the file, the method further comprising:

updating a second data structure to contain an identifier of the file, wherein the second data structure identifies files containing the at least one signature.

13. The method of claim 12, further comprising:

detecting another process causing reading of a second file;

accessing the second data structure to determine whether the second file is identified by the second data structure; and in response to determining that the second file is identified by the second data structure, updating the log with another event associated with reading the second file, and adding an identifier of the another process to the first data structure.

14. An information flow tracing method, executed by at least a first computer, comprising:

receiving at least one signature to trace;

detecting a first process causing data to be provided to at least one of a second process and a particular file;

determining whether the data contains the at least one signature;

in response to determining that the data contains the at least one signature, updating a log with information associated with providing the data to at least one of the second process and the particular file, wherein the log contains information identifying at least one of processes and files that are part of an information flow containing the at least one signature, wherein the data containing the at least one signature is written to the particular file in a network file server; and indicating, by the network file server, that the particular file contains the at least one signature to enable a client to be able to detect that a read of data containing the at least one signature is being performed.

15. A method executed in a distributed system having plural processes executable by at least one computer, comprising:

tracing a flow of at least one signature;

in an inter-process communication that is part of the flow, detecting for presence of the at least one signature in data associated with the inter-process communication, wherein the inter-process communication is between a first process sending data containing the at least one signature and a second process receiving the data;

in response to detecting that the inter-process communication involves the data containing the at least one signature, adding an identifier of the second process to a first data structure that already includes an identifier of the first process;

in response to a request that accesses a file, determining whether the request involves data containing the at least one signature, and in response to determining that the request involves data containing the at least one signature, adding an identifier of the file to a second data structure, wherein the request is part of the flow; and accessing the first and second data structures to identify processes and files in the flow for which determinations are to be made regarding whether associated data contains the at least one signature.

16. The method of claim 15, wherein the tracing and detecting tasks are performed by at least one of kernel and a shared library in the at least one computer.

17. A computer-readable storage medium storing instructions that when executed cause a computer to:

receive at least one signature to trace;

detect a request associated with a first process, wherein the request causes data to be provided to at least one of a second process and a file;

determine whether the data associated with the request contains the at least one signature;

in response to determining that the data associated with the request contains the at least one signature, update a log with information corresponding to the request, wherein the log contains information identifying at least one of processes and files that are part of a flow of the at least one signature, wherein the receiving, detecting, determining, and updating are part of the information flow tracing;

during tracing of the flow, updating a first data structure to identify processes that have accessed data containing the at least one signature;

during the tracing of the flow, updating a second data structure to identify files that contain the at least one signature; and during the tracing of the flow, updating offset maps that indicate locations in the identified files that contain the at least one signature.

\* \* \* \* \*